(12) United States Patent
Linnell

(10) Patent No.: US 6,534,716 B1
(45) Date of Patent: Mar. 18, 2003

(54) FIBRE CHANNEL CABLE

(75) Inventor: Thomas Linnell, Northboro, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/029,054

(22) Filed: Dec. 20, 2001

(51) Int. Cl.[7] .................................. H01B 7/04
(52) U.S. Cl. ................. 174/113 R; 174/116; 174/113 C
(58) Field of Search ........................ 174/113 R, 102 R, 174/106 R, 36, 113 C, 131 A, 116

(56) References Cited

U.S. PATENT DOCUMENTS

| | | | | |
|---|---|---|---|---|
| 2,212,927 A | * | 8/1940 | Baguley | 174/113 R |
| 2,759,991 A | * | 8/1956 | Rheiner et al. | 174/113 R |
| 4,486,623 A | * | 12/1984 | Ploppa | 174/110 V |
| 4,707,569 A | * | 11/1987 | Yoshimura et al. | 174/110 F |
| 5,216,202 A | * | 6/1993 | Yoshida et al. | 174/106 R |
| 5,574,250 A | * | 11/1996 | Hardie et al. | 174/102 R |

FOREIGN PATENT DOCUMENTS

JP   11-134947   * 5/1999

* cited by examiner

Primary Examiner—Chau N. Nguyen
(74) Attorney, Agent, or Firm—David E. Huang, Esq.; Chapin & Huang, L.L.C.

(57) ABSTRACT

In one embodiment of the present invention, a cable is provided that may be used to transmit signals that may be used to implement two fibre channel arbitrated loops.

19 Claims, 9 Drawing Sheets

FIBRE CHANNEL CABLE

BACKGROUND OF THE INVENTION

1. Field of the Invention

The present invention relates to cable that may be used to transmit signals that may be used to implement two fibre channel (FC) arbitrated loops.

2. Brief Description of Related Prior Art

Network computer systems generally include a plurality of geographically separated or distributed computer nodes that are configured to communicate with each other via, and are interconnected by, one or more network communications media. One conventional type of network computer system includes a network storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network storage subsystem, manufactured and sold by the Assignee of the subject application (hereinafter "Assignee") under the tradename Symmetrix™ (hereinafter referred to as the "Assignee's conventional storage system"), includes a plurality of disk mass storage devices (e.g., disk drives) configured as one or more redundant arrays of independent (or inexpensive) disks (RAID). The disk devices are controlled by disk controllers (commonly referred to as "back-end" input/output (I/O) controllers/directors) that may communicate (i.e., exchange data and commands) with the disk devices via Small Computer System Interface (SCSI) protocol communication channels. The disk controllers are coupled via a bus system to a shared cache memory resource in the subsystem. The cache memory resource is also coupled via the bus system to a plurality of host controllers (commonly referred to as "front-end" I/O controllers/directors). The disk controllers are coupled to respective disk adapters that, among other things, interface the disk controllers to the disk devices. Similarly, the host controllers are coupled to respective host channel adapters that, among other things, interface the host controllers via channel I/O ports to the network communications channels (e.g., SCSI, Enterprise Systems Connection (ESCON), or FC based communications channels) that couple the storage subsystem to computer nodes in the computer network external to the subsystem (commonly termed "host" computer nodes or "hosts").

In the Assignee's conventional storage system, the disk devices are grouped together into respective sets, and each set of disk devices may be controlled by a respective pair of disk controllers. If one of the disk controllers in the respective pair fails, the other (i.e., redundant) disk controller in the pair may assume the duties of the failed disk controller, and thereby permit the set of disk devices to continue to operate, despite the failure of the failed disk controller.

Also in the Assignee's conventional storage system, the disk devices are placed in respective housings and stored in one or more chassis. The chassis may include a multiplicity of sets of slots for receiving respective housings within which the respective disk devices are placed. The chassis may also include an electrical back plane having a multiplicity of electromechanical connectors. The connectors may be mated with respective electromechanical connectors of the housings to electrically and mechanically couple the disk devices to the chassis.

It has been proposed to replace with FC protocol communication channels the SCSI communication channels that permit communication among the disk devices and disk controllers in the Assignee's conventional data storage system, in order to increase the speed with which such communication may be performed. According to this proposal, the FC communication channels may comprise respective serial, unidirectional, FC communication rings or loops.

Each of these FC communication rings or loops may physically take the form of a respective plurality of cables that may couple a respective external I/O port of a respective one of the disk adapters to a respective set of disk devices. For example, in each such FC loop, FC data signals may be exchanged among a respective external I/O port of a respective disk adapter and a respective set of disk devices via one respective conventional electrical cable, and control signals associated with the loop may be exchanged among this external I/O port and set of disk devices via a different respective conventional electrical cable. Alternatively, in each such FC loop, the FC data signals and the control signals associated with the loop may be exchanged among the respective external I/O port of the respective disk adapter and the respective set of disk devices via a single respective conventional cable.

In the Assignee's conventional data storage system, each of the disk adapters may comprise a plurality of external I/O ports that may be coupled via respective FC loops to respective sets of disk devices. Thus, in the proposed arrangement described above, it may be necessary to use a relatively large number of conventional electrical cables to physically connect all of external I/O ports of the disk adapters to respective sets of disk devices, and it may also be necessary to use different types of cables (i.e., respective sets of cables for transmitting FC data and associated control signals). This is unfortunate, since, among other things, it increases the complexity of cabling connections that must be made among the disk adapters and disk devices, may result in an undesirably large amount of physical space being consumed by such connections, and may result in an undesirably large amount of time and effort being expended by human operators to properly install and manage such cables. Accordingly, it would be desirable to provide means to provide FC communication channels among the disk adapters and disk devices, wherein the number and complexity of cables required to implement such FC communication channels may be reduced compared to the afore-described proposed conventional arrangements.

SUMMARY OF THE INVENTION

In accordance with the present invention, an FC cable is provided that may be used in a network data storage system to overcome the aforesaid and other disadvantages of the prior art. In a first embodiment of the FC cable of the present invention, the cable may be used to transmit signals that may be used to implement both a first FC AL and a second FC AL that is distinct from the first FC AL; these FC arbitrated loops may provide FC communication channels among I/O ports of a disk adapter and sets of disk mass storage devices in a network data storage system. The cable of this embodiment may include first set of electrical conductors that may be used to transmit control signals associated with the first FC AL and the second FC AL, and a second set of electrical conductors that may be used to transmit the first and second FC arbitrated loops' respective data signals.

The first set of electrical conductors may be disposed outside of a periphery of a central region in the cable that contains the second set of electrical conductors. The second set of electrical conductors may comprise first and second subsets of electrical conductors. Each of the first and second subsets of electrical conductors may include two respective pairs of electrical conductors. The first subset of electrical conductors may be for transmitting the first FC AL's data signals, and the second subset of electrical conductors may be for transmitting the second FC AL's data signals. The first subset of electrical conductors may be disposed about a first central filler member, and may be surrounded by a first electrical shield member. The second subset of electrical conductors may be disposed about a second central filler member, and may be surrounded by a second electrical shield member.

The FC cable of the first embodiment may further comprise third and fourth electrical shield members. The third electrical shield member may surround the first set of electrical conductors, and the fourth electrical shield member may surround the third electrical shield member.

In the first embodiment of the present invention, each respective electrical conductor in the first and second sets of electrical conductors may comprise a respective metal core surrounded by an insulating material. Further, the central region in the cable of this embodiment may contain two additional filler members, and may be enclosed by a binding member. The cable of this embodiment may further comprise a foil shield member that surrounds the first set of electrical conductors, and a braided shield member that surrounds the foil shield member.

In an FC cable made according to a second embodiment of the present invention, the cable may be used to transmit signals that may be used to implement both a first FC AL and a second FC AL; these FC arbitrated loops may provide FC communication channels among I/O ports of a disk adapter and sets of disk mass storage devices in a network data storage system. The FC cable of the second embodiment of the present invention may comprise a first set of electrical conductors that may be used to transmit respective control signals associated with the first FC AL and the second FC AL, and a second set of electrical conductors that may be used to transmit respective data signals of the first FC AL and the second FC AL.

In the cable of the second embodiment of the present invention, the first set of electrical conductors may be disposed around a central region in the cable, which central region may contain the second set of electrical conductors. The second set of electrical conductors may comprise first, second, third and fourth subsets of electrical conductors. Each of these subsets of electrical conductors may include a respective pair of electrical conductors that may transmit a respective subset of the first and second FC arbitrated loops' data signals.

Also in the cable of the second embodiment of the present invention, the subsets of electrical conductors may be disposed about a central filler member that is disposed at a central portion of the cable. Each of the subsets of electrical conductors may be surrounded by a respective electrical shield member. The cable of the second embodiment may further comprise a foil shield member that surrounds the first set of electrical conductors, and braided shield member that surrounds the foil shield member.

Additionally in the cable of the second embodiment of the present invention, each respective electrical conductor in the first and second sets of electrical conductors may comprise a respective metal core surrounded by an insulating material, and the central region may be enclosed by a binding member. Also, the cable of the second embodiment of the present invention may further comprise a foil shield member that surrounds the first set of electrical conductors, and a braided shield member that surrounds the foil shield member.

Thus, in summary, each of the FC cables made according to the first and second embodiments of the present invention may include electrical conductors that may be used to transmit the signals (i.e., FC data and associated control signals) that are necessary to implement two respective FC arbitrated loops. When cables made according to these embodiments of the present invention are used to implement FC communication channels among disk adapter I/O ports and disk mass storage devices in a network data storage system, the number of such cables that may be needed to implement such channels may be fewer than the number of cables that may be required to implement such channels according to the above-described proposed conventional arrangements. Additionally, when cables made according to these embodiments of the present invention are used to implement FC communication channels among disk adapter I/O ports and disk mass storage devices in such a network data storage system, only the cables made according to said embodiments may need to be coupled to the disk adapter I/O ports. Advantageously, these features of these embodiments of the present invention may permit the number and complexity of cabling connections that must be made among the disk adapters and disk devices to implement FC communication channels among the disk adapters and disk devices to be reduced compared to the afore-described proposed conventional arrangements.

These and other features and advantages of the present invention will become apparent as the following Detailed Description proceeds and upon reference to the Figures of the Drawings, in which like numerals depict like parts, and wherein:

Although the following Detailed Description will proceed with reference being made to illustrative embodiments and methods of use of the present invention, it should be understood that it is not intended that the present invention be limited to these illustrative embodiments and methods of use. On contrary, many alternatives, modifications, and equivalents of these illustrative embodiments and methods of use will be apparent to those skilled in the art. Accordingly, the present invention should be viewed broadly as encompassing all such alternatives, modifications, and equivalents as will be apparent to those skilled in art, and should be viewed as being defined only as forth in the hereinafter appended claims.

DETAILED DESCRIPTION OF ILLUSTRATIVE EMBODIMENTS

Figure 1:
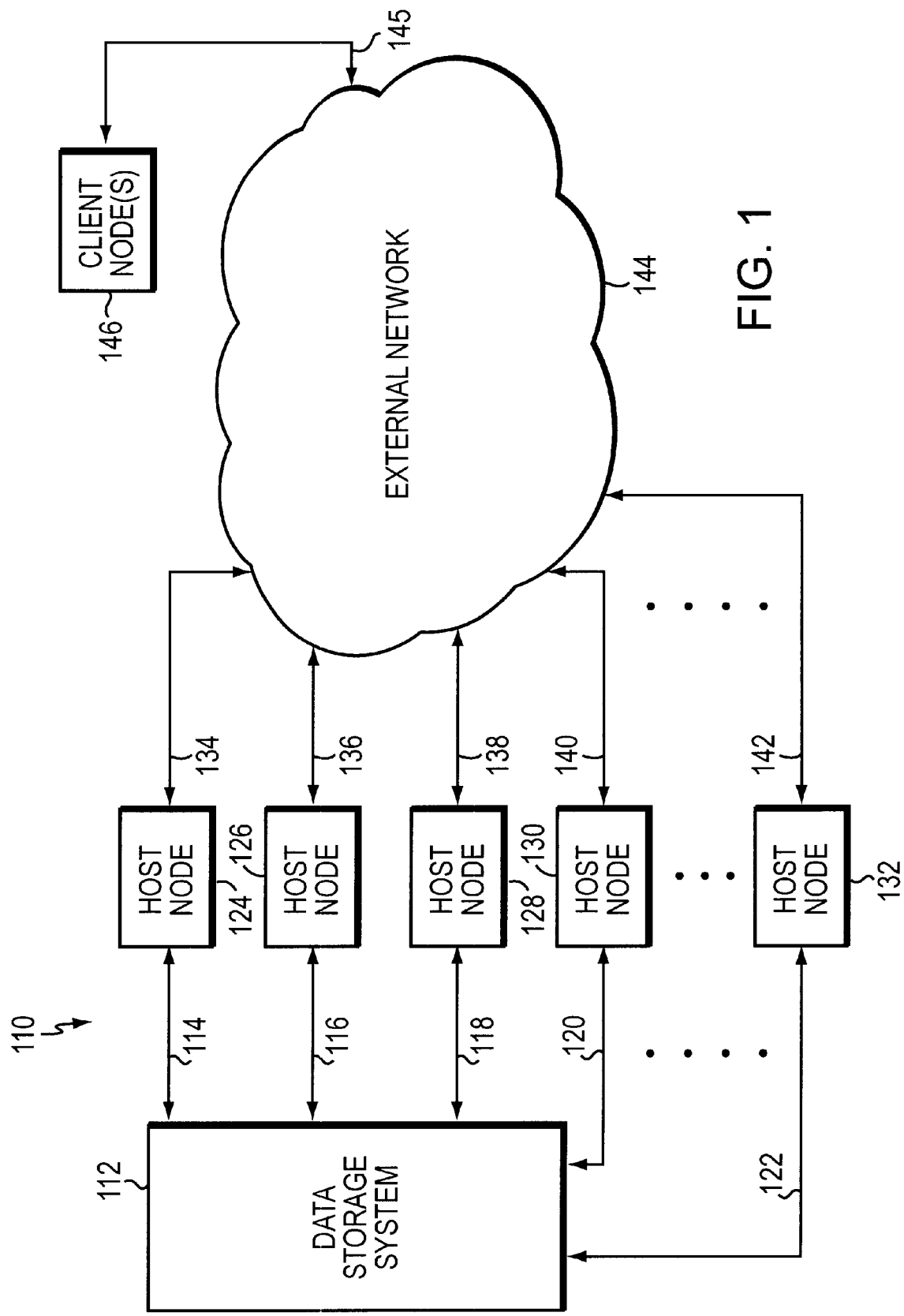
FIG. 1 is a high-level schematic block diagram of a data storage network that includes a data storage system wherein one embodiment of the present invention may be practiced to advantage.

Turning now to the Figures, illustrative embodiments of the present invention will be described. FIG. 1 is a high level block diagram illustrating a data storage network 110 that includes a data storage system 112 wherein one embodiment of the subject invention may be practiced to advantage. System 112 is coupled via FC protocol optical communication links 114, 116, 118, 120, . . . 122 to respective host computer nodes 124, 126, 128, 130, . . . 132. Host nodes 124, 126, 128, 130, . . . 132 are also coupled via additional respective conventional network communication links 134, 136, 138, 140, . . . 142 to an external network 144. Network 144 may comprise one or more Transmission Control Protocol/Internet Protocol (TCP/IP)-based and/or Ethernet-based local area and/or wide area networks. Network 144 is also coupled to one or more client computer nodes (collectively or singly referred to by numeral 146 in FIG. 1) via network communication links (collectively referred to by numeral 145 in FIG. 1). The network communication protocol or protocols utilized by the links 134, 136, 138, 140, . . . 142, and 145 are selected so as to ensure that the nodes 124, 126, 128, 130, . . . 132 may exchange data and commands with the nodes 146 via network 144.

Host nodes 124, 126, 128, 130, . . . 132 may be any one of several well-known types of computer nodes, such as server computers, workstations, or mainframes. In general, each of the host nodes 124, 126, 128, 130, . . . 132 and client nodes 146 comprises a respective computer-readable memory (not shown) for storing software programs and data structures associated with, and for carrying out the functions and operations described herein as being carried by these nodes 124, 126, 128, 130, . . . 132, and 146. In addition, each of the nodes 124, 126, 128, 130, . . . 132, and 146 further includes one or more respective processors (not shown) and network communication devices for executing these software programs, manipulating these data structures, and for permitting and facilitating exchange of data and commands among the host nodes 124, 126, 128, 130, . . . 132 and client nodes 146 via the communication links 134, 136, 138, 140, . . . 142, network 144, and links 145. The execution of the software programs by the processors and network communication devices included in the hosts 124, 126, 128, 130, . . . 132 also permits and facilitates exchange of data and commands among the nodes 124, 126, 128, 130, . . . 132 and the system 112 via the FC links 114, 116, 118, 120, . . . 122, in the manner that will be described below.

Figure 2:
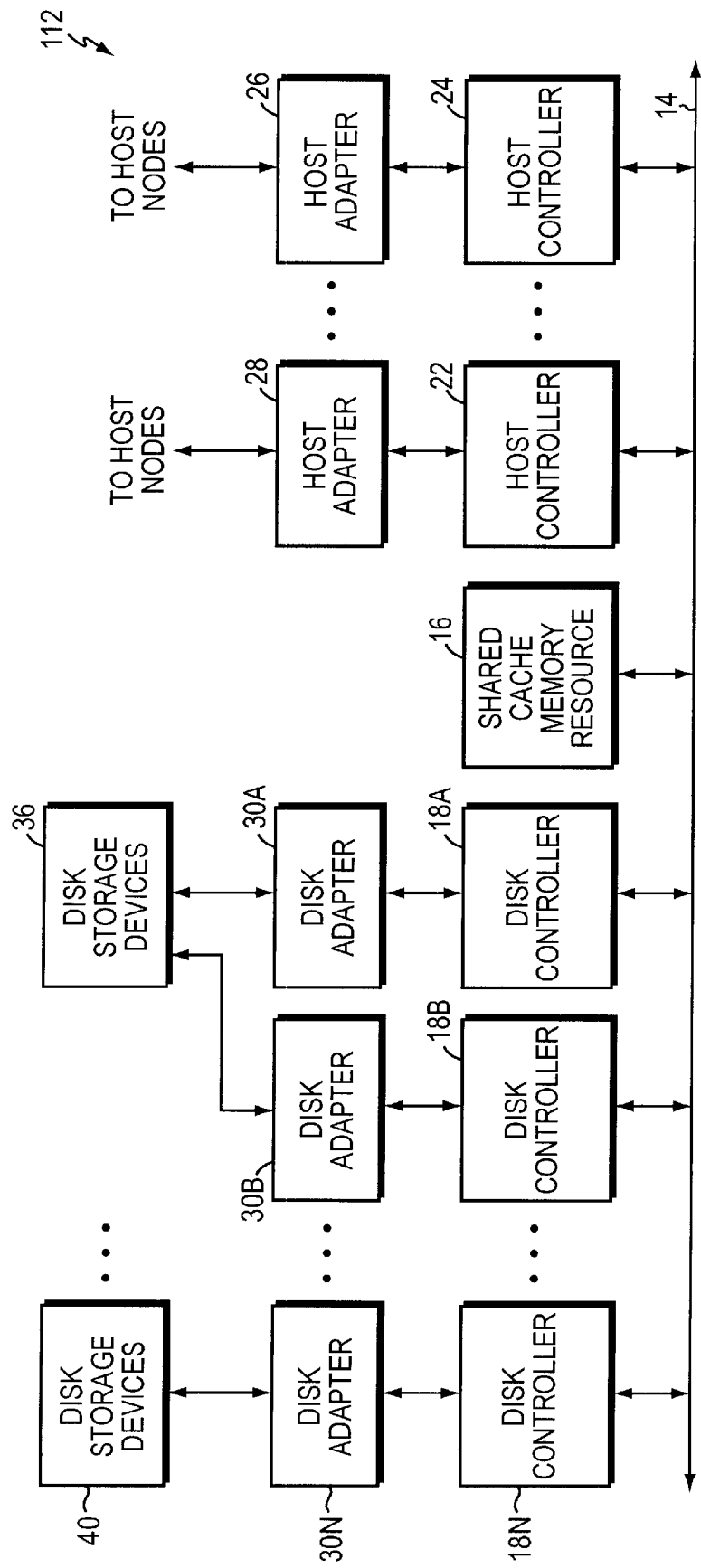
FIG. 2 is a high-level schematic block diagram illustrating functional components of the network data storage system included in the data storage network shown in FIG. 1.

FIG. 2 is a high-level schematic block diagram of functional components of the system 112. System 112 may include a bus system 14 that electrically couples together a plurality of host controllers 22 . . . 24, a plurality of disk controllers 18A . . . 18N, a plurality of disk adapters 30A . . . 30N, and a shared cache memory resource 16. Bus system 14 may include a plurality of redundant buses (not shown) and a bus arbitration and control system (also not shown).

Each host controller 22 . . . 24 may comprise a single respective circuit board or panel. Likewise, each disk controller 18A . . . 18N may comprise a single respective circuit board or panel. Each disk adapter 30A . . . 30N may comprise a single respective circuit board or panel. Likewise, each host adapter 26 . . . 28 may comprise a single respective circuit board or panel. Each host controller 22 . . . 24 may be electrically and mechanically coupled to a respective host adapter 28 . . . 26, respectively, via a respective mating electromechanical coupling system. Similarly, each disk controller 18A . . . 18N may be electrically and mechanically coupled to a respective disk adapter 30A . . . 30N, respectively, via a respective mating electromechanical coupling system.

In this embodiment of system 112, although not shown explicitly in the Figures, each host adapter 26 . . . 28 may be coupled to four respective host nodes via respective FC links. For example, in this embodiment of system 112, adapter 26 may be coupled to host nodes 124, 126, 128, 130 via respective FC links 114, 116, 118, 120. It should be appreciated that the number of host nodes to which each host adapter 26 . . . 28 may be coupled may vary, depending upon the particular configurations of the host adapters 26 . . . 28, and host controllers 22 . . . 24, without departing from the present invention.

System 112 also includes a plurality of sets of disk mass storage devices 36 . . . 40. As is described more fully below, in system 112, a failover redundancy arrangement may be implemented wherein each of the sets of mass storage devices is controlled by a respective pair of disk controllers. For example, the set of devices 36 may be controlled by disk controllers 18A, 18B. Each of the disk controllers 18A, 18B may exchange data and commands with the devices 36 via a respective disk adapter 30A, 30B. That is, each disk adapter 30A, 30B may be electrically coupled to devices 36, and may interface the respective disk controller 18A, 18B with which it is associated to devices 36 so as to permit exchange of data and commands between processors (not shown) in the disk controllers 18A, 18B and the storage devices in the set 36 using, e.g., an FC communication protocol. The devices 36 . . . 40 may be configured as redundant arrays of disk mass storage devices. Although not shown in the Figures, it should be understood that the devices 40 may also be controlled by a respective pair of disk controllers, which pair may comprise controller 18N and another disk controller (not shown).

It should be appreciated that the respective numbers of the respective functional components of system 112 shown in FIG. 2 are merely for illustrative purposes, and depending upon the particular application to which the system 112 is intended to be put, may vary without departing from the present invention. For example, it may be desirable to permit other functional components in the system 112 to be capable of failover fault tolerance. Thus, in practical implementation of the system 112, it may be desirable that the system 112 include additional redundant functional components (e.g., redundant pairs of host controllers, etc.) and mechanisms for ensuring that the failure of any functional component is detected and the operations of any failed functional component are assumed by a respective redundant functional component of the same type as the failed component.

The general manner in which data may be retrieved from and stored in the system 112 will now be described. Broadly speaking, in operation of network 110, a client node 146 may forward a request to retrieve data to a host node (e.g., node 124) via one of the links 145 associated with the client node 146, network 144 and the link 134 associated with the host node 124. If data being requested is not stored locally at the host node 124, but instead, is stored in the data storage system 112, the host node 124 may request the forwarding of that data from the system 112 via the FC link 114 associated with the node 124.

The request forwarded via link 114 is initially received by the host adapter 26 coupled to that link 114. The host adapter 26 associated with link 114 may then forward the request to the host controller 24 to which it is coupled. In response to the request forwarded to it, the host controller 24 may then ascertain from data storage management tables (not shown) stored in the cache 16 whether the data being requested is currently in the cache 16; if the requested data is currently not in the cache 16, the host controller 24 may request that a disk controller (e.g., controller 18A) that is actively controlling the storage devices in set 36 within which the requested data is stored retrieve the requested data into the cache 16. In response to the request from the host controller 24, the disk controller 18A may forward via the disk adapter 30A to which it is coupled appropriate commands for causing one or more of the disk devices in set 36 to retrieve the requested data. In response to such commands, these disk devices 36 may forward the requested data to the disk controller 18A via the disk adapter 30A. The disk controller 18A may then store the requested data in the cache 16.

When the requested data is in the cache 16, the host controller 22 may retrieve the data from the cache 16 and forward it to the host node 124 via the adapter 26 and link 114. The host node 124 may then forward the requested data to the client node 146 that requested it via the link 134, network 144 and the link 145 associated with the client node 146.

Additionally, a client node 146 may forward a request to store data to a host node (e.g., node 124) via one of the links 145 associated with the client node 146, network 144 and the link 134 associated with the host node 124. The host node 124 may store the data locally, or alternatively, may request the storing of that data in the system 112 via the FC link 114 associated with the node 124.

The data storage request forwarded via link 114 is initially received by the host adapter 26 coupled to that link 114. The host adapter 26 associated with link 114 may then forward the data storage request to the host controller 24 to which it is coupled. In response to the data storage request forwarded to it, the host controller 24 may then initially store the data in cache 16. Thereafter, one of the disk controllers (e.g., controller 18A) may cause that data stored in the cache 16 to be stored in one or more of the data storage devices in the set 36 that it is actively controlling, by issuing appropriate commands for same to these devices via its associated adapter 30A.

Figure 3:
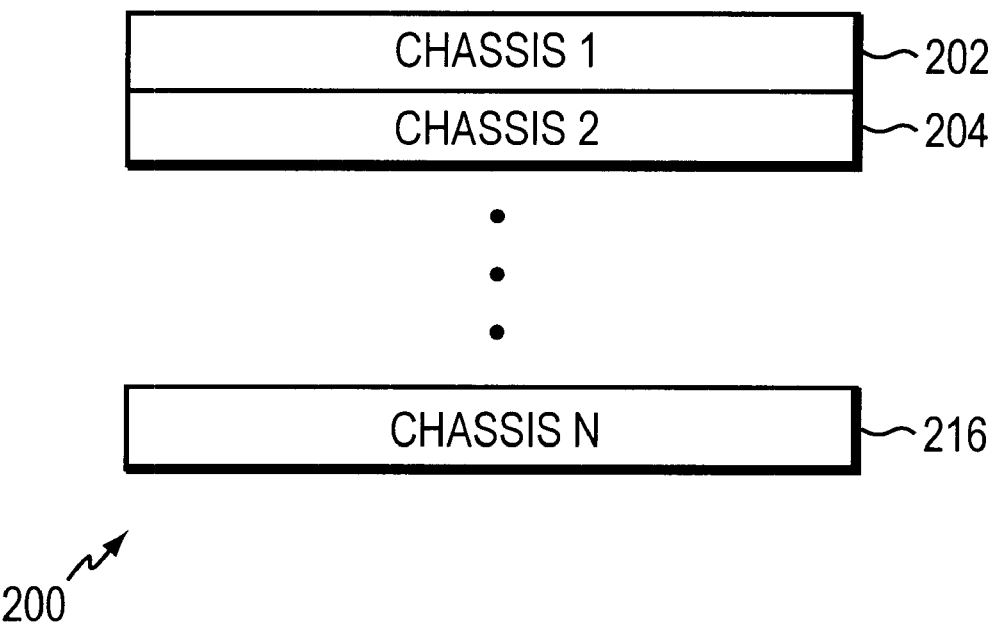
FIG. 3 is a highly schematic block diagram illustrating features of a mass storage device mounting system that may be used in the network data storage system illustrated in FIG. 2.

One or more of the sets of the disk devices 36 . . . 40 in system 112 may be stored and mounted in at least one disk device mounting system 200 of the type described in co-pending U.S. patent application Ser. No. 09/877,808, entitled "Mass Storage Device Mounting System," filed Jun. 7, 2001; this co-pending U.S. Patent Application is owned by the owner of the subject application and is hereby incorporated herein by reference in its entirety. As shown in FIG. 3, depending upon the number of disk devices 36 . . . 40 stored in mounting system 200, system 200 may comprise one disk mounting chassis 202, or a plurality of such chassis 202, 204, . . . 216. The respective construction and operation of each respective chassis 202, 204, . . . 216 are substantially identical.

Each of the sets of disk devices that are stored and mounted the mounting system 200 may be coupled to the system 200 via a respective electromechanical connector (not shown). More specifically, each of the chassis 202, 204, . . . 216 in the mounting system 200 may include a respective electrical back plane (not shown) that may comprise a respective set of electromechanical connectors (not shown) to which respective disk devices may be coupled. The electromechanical connectors comprised in each respective set of electro-mechanical connectors may be electrically connected via circuit connections (not shown) in the respective back plane of the respective chassis that comprises them to a configurable FC communication system (not shown) of the type disclosed in the co-pending U.S. patent application Ser. No. 09/877,848, entitled "Configurable Fibre Channel Loop System," filed Jun. 7, 2001; this co-pending U.S. Patent Application is owned by the owner of the subject application and is hereby incorporated herein by reference in its entirety. As is described in co-pending U.S. patent application Ser. No. 09/877,848, the configurable FC communication system may include two respective FC port bypass circuit (PBC) cards in each respective chassis in mounting system 200 that may be coupled to the not shown circuit connections in the back plane of the respective chassis via not shown mating electromechanical connectors; when respective sets of disk mass storage devices are properly mounted in the respective chassis, the two respective PBC cards in each respective chassis may permit, among other things, the respective sets of disk devices to be electrically coupled to two respective disk adapters in the system 112 such that the two respective disk controllers that are coupled to the respective disk adapters may be coupled to, and may exchange data and commands using FC protocol-based communication techniques with, the disk devices in the respective chassis. Additionally, as is described in co-pending U.S. patent application Ser. No. 09/877,848, the respective PBC cards in each chassis in the mounting system 200 also may facilitate fail-over fault tolerance among the respective disk controllers and disk adapters that may be coupled to the respective PBC cards, and may facilitate fault isolation among the disk mass storage devices that may be coupled to the respective PBC cards.

More specifically, I/O ports of the disk adapters in system 112 may be coupled to PBC cards in the system 112 via FC cables made in accordance with embodiments of the present invention (and respective, not shown back plane connections in the mounting system 200). For example, two I/O ports (not shown) in adapter 30A may be coupled via a single FC cable (e.g., cable 400 or cable 500 shown in FIGS. 7 and 8, respectively), made in accordance with either a first embodiment or a second embodiment, respectively, of the present invention, to respective I/O ports (not shown) in two respective PBC cards in a chassis (e.g., chassis 202) in the mounting system 200.

Figure 4:
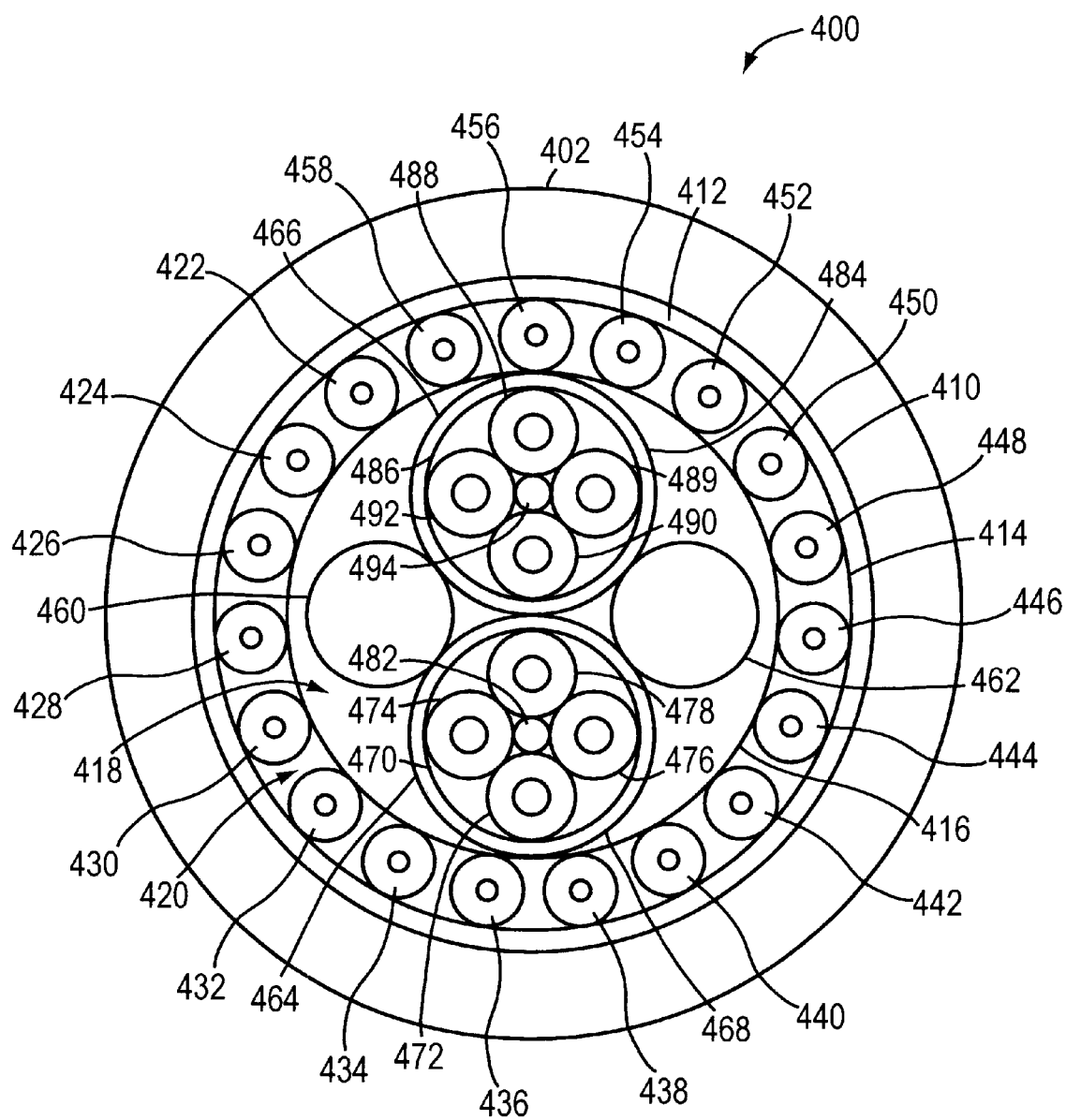
FIG. 4 is a highly schematic, cross-sectional diagram illustrating construction of an FC cable made according a first embodiment of the present invention.
Figure 6:
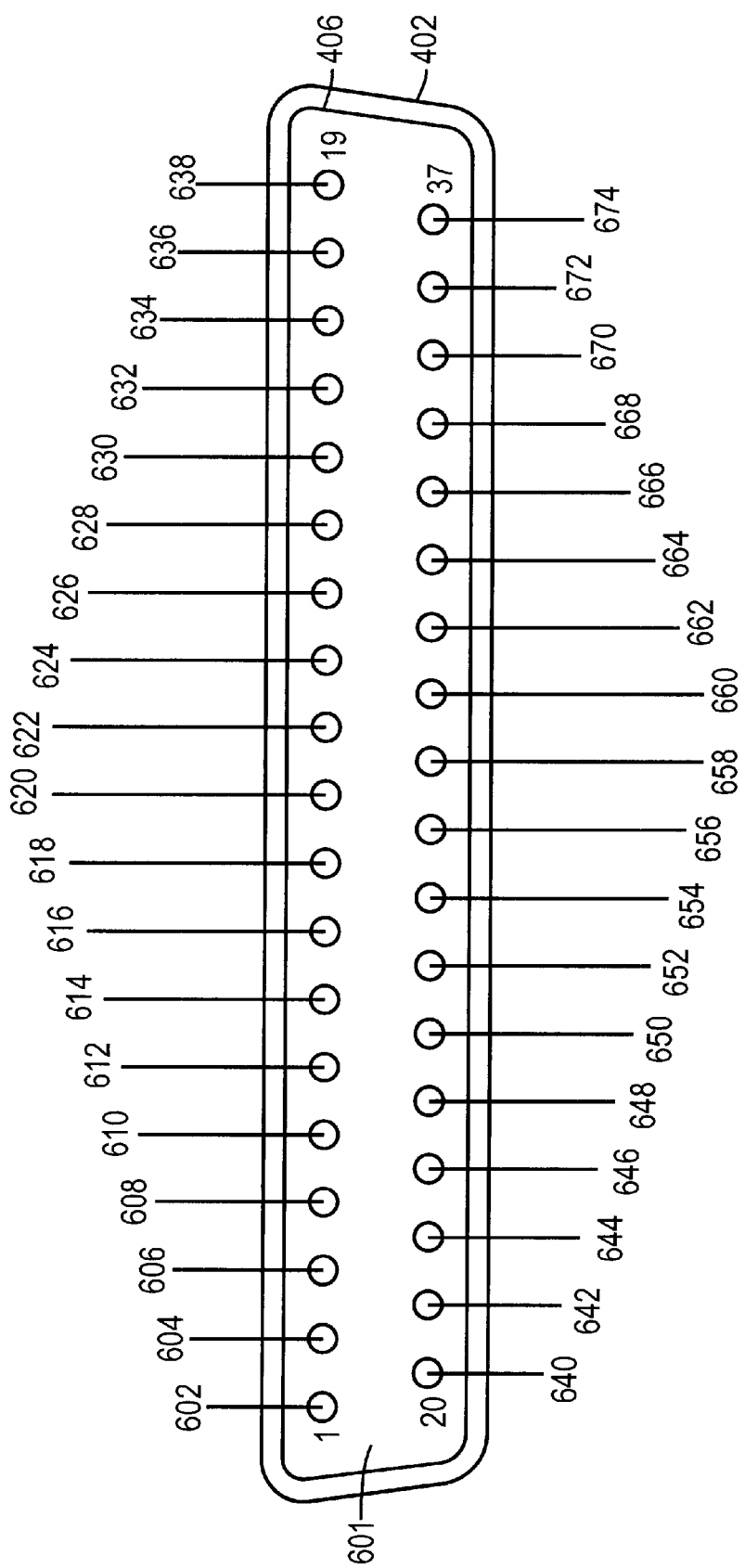
FIG. 6 is a highly schematic diagram for use in describing the signals that may be transmitted using electrical conductors comprised in the cable of FIG. 4.
Figure 7:
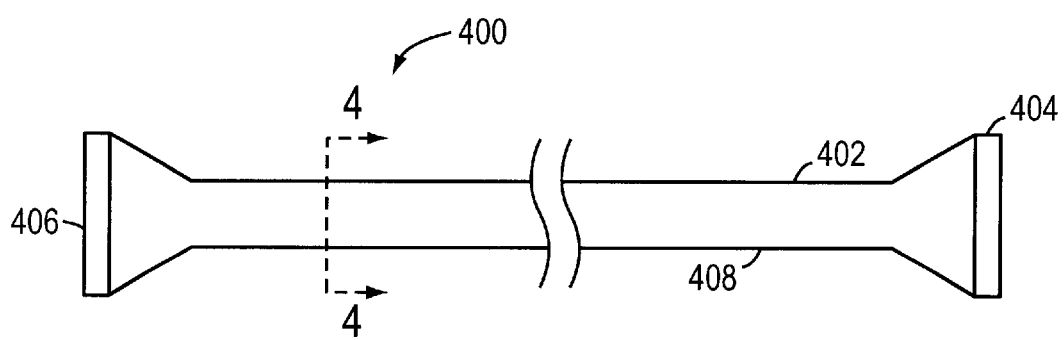
FIG. 7 is a highly schematic diagram illustrating externally viewable components of the cable of FIG. 4.

With particular reference being made to FIGS. 4, 6, and 7, the construction of cable 400 will be described. Cable 400 may comprise an electrically insulating, polyvinyl chloride (PVC) outer jacket/housing 402, and may include an elongate, flexible, generally tubular portion 408 that may be terminated on respective ends by respective connector mechanisms (shown in FIG. 7 by the structures referenced by numerals 404 and 406, respectively). One of the connector mechanisms 406 in the cable 400 may be configured for coupling (i.e., mating electromechanical coupling) to two I/O ports in the adapter 30A, and the other connector mechanism 404 in the cable 400 may be configured for coupling (i.e., mating electromechanical coupling) via a back plane connector in the chassis 202) to respective I/O ports in two respective PBC cards in chassis 202.

FIG. 4 is a schematic cross-sectional drawing (taken along the transverse cross-section of cable 400 denoted by lines 4—4 in FIG. 7) illustrating the internal construction of the cable 400 and components of the cable 400 that may be housed in the jacket 402. The jacket 402 may have a generally circular transverse cross-section and may have a thickness of 0.024 inches. The overall diameter of the portion 408 may be 0.385 inches. The jacket 402 may be attached to, surround, and enclose an electrically conducting, outer electromagnetic shield member 410. The outer shield member 410 may be disposed in physical contact with the inner surface of the jacket 402 and may have a generally circular transverse cross-section. Additionally, the outer shield member 410 may be made of 38 AWG tin-plated copper material.

Attached along the inner surface of the member 410 may be an inner, electro-magnetic aluminum/polyester tape shield member that may comprise a layer of aluminum foil 414 bonded to a layer of insulating polyester material 412. The inner shield member may have a generally circular transverse cross-section.

An internal annular space 420 may be comprised in the cable 400. This space 420 may be defined and delimited by the aluminum foil 414 and a binder member 416. The binder member 416 may have a generally circular transverse cross-section, may contact the outer surfaces of FC differential pair bundles 464 and 466 (whose construction and purposes will be described below), and may be made out of a polyester material.

Control signal conductor members 422, 424, 426, 428, 430, 432, 434, 436, 438, 440, 442, 444, 446, 448, 450, 452, 454, 456, and 458 are disposed within the space 420, and are confined in space 420 by the binder member 416 and the inner shield member. Each of the members 422, 424, 426, 428, 430, 432, 434, 436, 438, 440, 442, 444, 446, 448, 450, 452, 454, 456, and 458 may have an identical construction; accordingly, only the construction of one 422 of the members 422, 424, 426, 428, 430, 432, 434, 436, 438, 440, 442, 444, 446, 448, 450, 452, 454, 456, and 458 is described herein. Conductor member 422 has a generally circular cross-section, and comprises an inner, electrically conductive wire/filament (e.g., made out of tin plated copper material) surrounded by a layer of insulating material (e.g., semi-rigid PVC material). The wire/filament in member 422 may be 28 AWG material and may be 0.015 inches in diameter. The layer of insulating material in member 422 may be 0.037 inches in diameter and 0.011 inches in thickness, respectively.

The binder member 416 may define and delimit a central space/region 418 within the portion 408 of the cable 400. The region 418 may contain and enclose two FC differential pair bundles 464 and 466. The outer surfaces of the bundles 464 and 466 may physically contact each other, two central region filler members 460 and 462, and the inner surface of the binder member 416. The central region filler members 460 and 462 have generally circular, respective transverse cross-sections, and may be made out of solid polyethylene.

One 464 of the bundles 464, 466 may comprise two pairs 472, 474 and 476, 478, respectively, of FC AL differential data signal conductor/transmitter members disposed about a central filler member 482 and enclosed by a bundle electromagnetic shield member 468. The other 466 of the bundles 464, 466 may comprise two pairs 488, 489 and 490, 492, respectively, of FC AL differential data signal conductor/transmitter members disposed about a central filler member 494 and enclosed by a bundle shield member 484. Each of the central filler members 482 and 494 may be made of solid polyethylene. Each of the FC AL differential data signal conductor/transmitter members that are comprised in the bundles 472, 474, 476, 478 may comprise a respective central conductive wire/filament (e.g., 27 AWG solid silver plated copper material that is 0.0142 inches in diameter) surrounded by a respective layer of insulating material (e.g., polyolefin material that is 0.018 inches in thickness and 0.052 inches in diameter). The shield members 468 and 484 may each comprise respective aluminum/polyester tapes, with each such tape comprising a respective outwardly facing layer of aluminum bonded to a respective layer of polyester 470, 486.

Each of the above-described features 402, 410, 412, 414, 416, 418, 420, 422, 424, 426, 428, 430, 432, 434, 436, 438, 440, 442, 444, 446, 448, 450, 452, 454, 456, 458, 460, 462, 464, 466, 468, 470, 472, 474, 476, 478, 482, 484, 486, 488, 489, 490, and 492 may extend at least the length of the member 408, and additionally, the cable 400 may be configured and constructed such that each of the electrically conductive structures comprised in the cable 400 (e.g., the outer shield member 410, the aluminum layer 414 of the inner shield member, the filaments/wires comprised in the FC control signal conductor members 422, 424, 426, 428, 430, 432, 434, 436, 438, 440, 442, 444, 446, 448, 450, 452, 454, 456, and 458, the aluminum layers comprised in the shield members 468 and 484, and the filaments/wires comprised in the FC AL differential data signal conductor members 472, 474, 476, 478, 488, 489, 490, and 492 may terminate with a respective conductive termination at each of the connector mechanisms 404 and 406. The connector mechanisms 404 and 406 (and the respective sets of conductive terminations comprised therein) may be either male or female in respective connection gender depending upon the respective connection genders of the respective connectors (not shown) to which they are intended to be coupled.

It is important to note that the dimensions stated herein for the various components of the cable 400 are merely for illustrative purposes. Accordingly, the dimensions of the components of the cable 400 may vary without departing from the first embodiment of the present invention.

With reference now being made to FIGS. 4 and 6, the respective FC control, data, and other signals that may be transmitted via the afore-described electrically conductive structures illustrated in FIG. 4 will be described. FIG. 6 is a schematic illustration showing the set 601 of respective terminations 602, 604, . . . 674 that may be provided in the connector mechanism 406. Terminations (not shown) may be provided in the connector mechanism 404 that may correspond to the terminations 602, 604, . . . 674 in connector mechanism 406.

Terminations 602 and 640 may be used to transmit a differential pair of FC receive data signals, via the conductive filaments/wires in differential pair members 472 and 474, for use in implementing a first FC AL for use in communicating between the disk adapter 30A and one of the PBC cards in the chassis 202. Terminations 604 and 642 may be used to transmit logical ground signals, via the aluminum layer comprised in the bundle shield member 468, for use in connection with the FC receive and transmit signals, respectively, used in the first FC AL. Terminations 606 and 644 may be used to transmit a differential pair of FC transmit data signals, via the conductive filaments/wires in differential pair members 476 and 478, for use in implementing the first FC AL. Terminations 638 and 674 may be used to transmit a differential pair of FC transmit data signals, via the conductive filaments/wires in differential pair members 490 and 492, for use in implementing a second FC AL for use in communicating between the adapter 30A and another of the PBC cards in the chassis 202. Terminations 634 and 670 may be used to transmit a differential pair of FC receive data signals, via the conductive filaments/wires in the differential pair members 488 and 489, for use in implementing the second FC AL. Terminations 636 and 672 may be used to transmit logical ground signals, via the aluminum layer comprised in the bundle shield member 484, for use in connection with the FC transmit and receive signals, respectively, used in the second FC AL.

Terminations 620, 646 and 668 may be used to transmit ground signals, via the aluminum layer 414, for use in the first and second FC AL. Terminations 616, 618, 622, and 624 may be unused (i.e., spare terminations). The remaining terminations 608, 610, 612, 614, 626, 628, 630, 632, 648, 650, 652, 654, 656, 658, 660, 662, 664, and 666 may be used to transmit respective control signals, via respective conductive filaments/wires comprised in respective FC control signal conductive members 422, 424, 426, 428, 430, 432, 434, 436, 438, 440, 442, 444, 446, 448, 450,.452, 454, 456, and 458, that may be associated with or used by devices coupled to either the first or the second FC AL. Such control signals may be used, e.g., to sense whether the first and second FC AL are coupled to active ports of PBC cards in the chassis 202, to control disk subsystems coupled to the first and second FC AL, to provide an out-of-band reset signals to the PBC cards coupled to the adapter 30A, to provide information from environmental sensing devices concerning the environmental status within the mounting system 200, to provide serial interrupt signals involving or for use by such disk subsystems, and to provide logical address information that may be assigned to chassis comprised in the mounting system 200, in accordance with the teachings of co-pending U.S. patent application Ser. No. 09/877,869, entitled "Address Mapping In Mass Storage Device Mounting System," filed Jun. 7, 2001, and owned by the owner of the subject application; said co-pending U.S. Patent Application is hereby incorporated herein by reference in its entirety.

Figure 5:
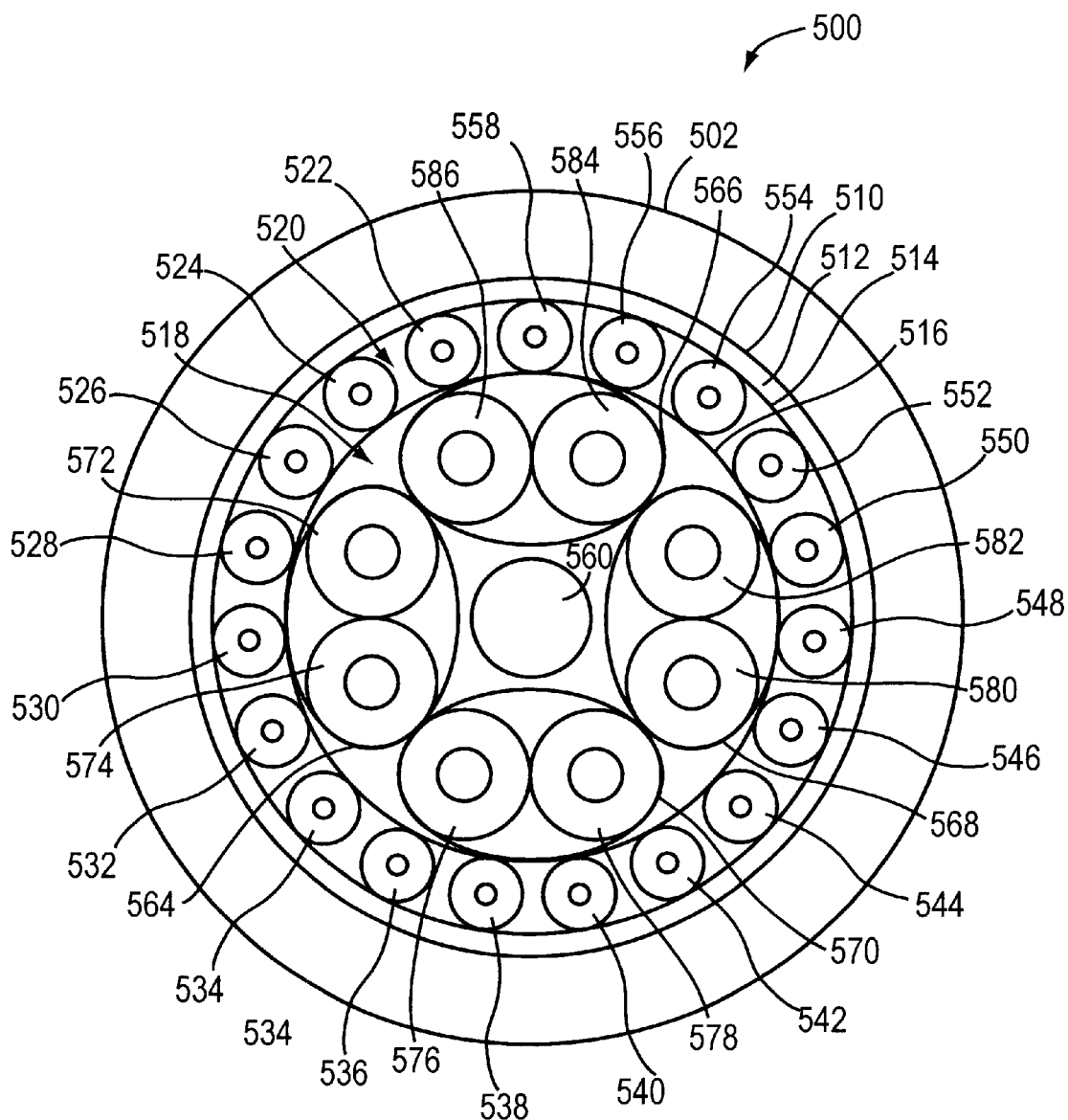
FIG. 5 is a highly schematic, cross-sectional diagram illustrating construction of an FC cable made according to a.second embodiment of the present invention.
Figure 8:
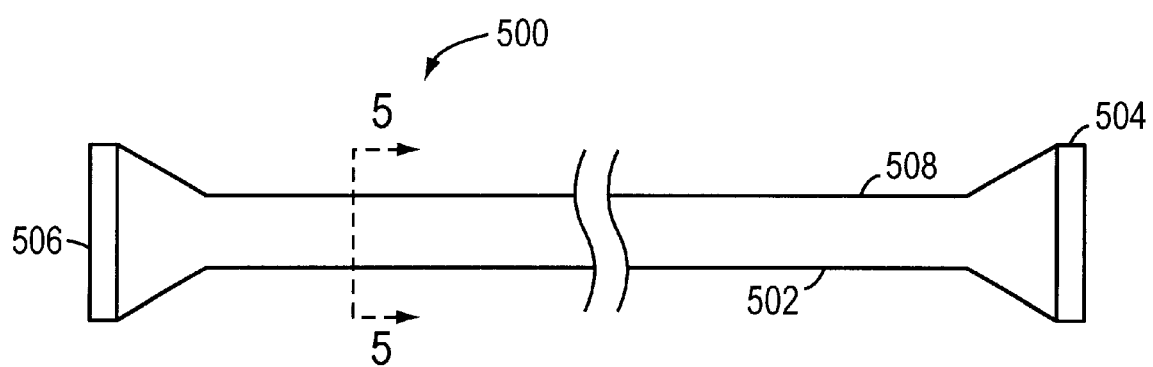
FIG. 8 is a highly schematic diagram illustrating externally viewable components of the cable of FIG. 5.
Figure 9:
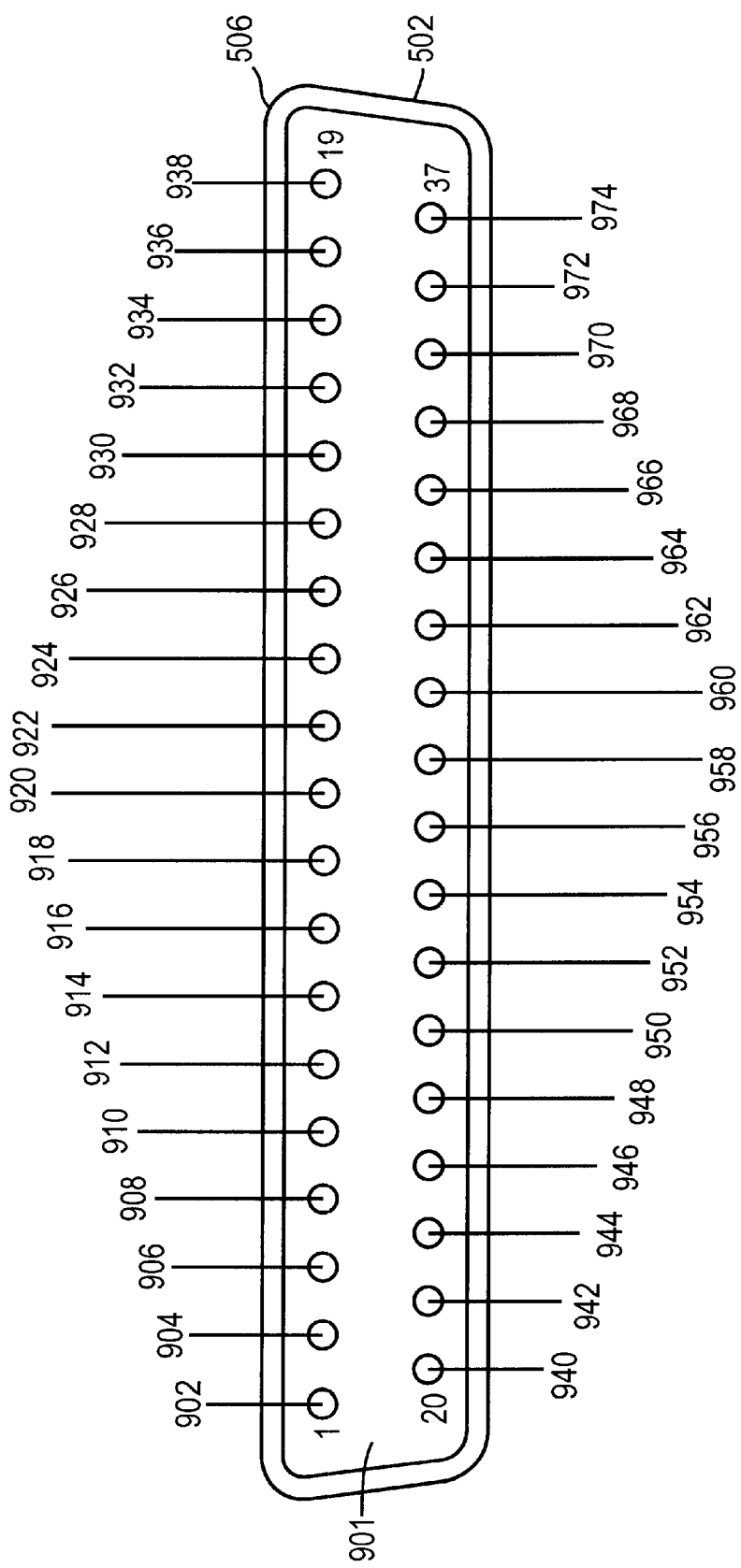
FIG. 9 is a highly schematic diagram for use in describing the signals that may be transmitted using electrical conductors comprised in the cable of FIG. 5.

With particular reference being made to FIGS. 5, 8, and 9, the construction of cable 500 will be described. Cable 500 may comprise an electrically insulating, polyvinyl chloride (PVC) outer jacket/housing 502, and may include an elongate, flexible, generally tubular portion 508 that may be terminated on respective ends by respective connector mechanisms (shown in FIG. 8 by the structures referenced by numerals 504 and 506, respectively). One of the connector mechanisms 506 in the cable 500 may be configured for coupling (i.e., mating electromechanical coupling) to two I/O ports in the adapter 30A, and the other connector mechanism 504 in the cable 500 may be configured for coupling (i.e., mating electromechanical coupling) via a back plane connector in the chassis 202) to respective I/O ports in two respective PBC cards in chassis 202.

FIG. 5 is a schematic cross-sectional drawing (taken along the transverse cross-section of cable 500 denoted by lines 5—5 in FIG. 8) illustrating the internal construction of the cable 500 and components of the cable 500 that may be housed in the jacket 502. The jacket 502 may have a generally circular transverse cross-section and may have a thickness of 0.025 inches. The overall diameter of the portion 508 may be 0.385 inches. The jacket 502 may be attached to, surround, and enclose an electrically conducting, outer electromagnetic shield member 510. The outer shield member 510 may be disposed in physical contact with the inner surface of the jacket 502 and so as to have a generally circular transverse cross-section. Additionally, the outer shield member 510 may be made of 36 AWG tin-plated copper material.

Attached along the inner surface of the member 510 may be an inner, electro-magnetic aluminum/polyester tape shield member that may comprise a layer of aluminum foil 514 bonded to a layer of insulating polyester material 512. The inner shield member may have a generally circular transverse cross-section.

An internal annular space 520 may be comprised in the cable 500. This space 520 may be defined and delimited by the aluminum foil 514 and a binder member 516. The binder member 516 may have a generally circular transverse cross-section, and may contact the outer surfaces of FC differential pair bundles 564, 566, 568, and 570 (whose construction and purposes will be described below), and may be made out of a polyester material.

Control signal conductor members 522, 524, 526, 528, 530, 532, 534, 536, 538, 540, 542, 544, 546, 548, 550, 552, 554, 556, and 558 are disposed within the space 520, and are confined in space 520 by the binder member 516 and the inner shield member. Each of the members 522, 524, 526, 528, 530, 532, 534, 536, 538, 540, 542, 544, 546, 548, 550, 552, 554, 556, and 558 may have an identical construction; accordingly, only the construction of one 522 of the members 522, 524, 526, 528, 530, 532, 534, 536, 538, 540, 542, 544, 546, 548, 550, 552, 554, 556, and 558 is described herein. Conductor member 522 has a generally circular cross-section, and comprises an inner, electrically conductive wire/filament (e.g., made out of tin plated copper material) surrounded by a layer of insulating material (e.g., semi-rigid PVC material). The wire/filament in member 522 may be 30 AWG material. The layer of insulating material in member 522 may be 0.030 inches in diameter.

The binder member 516 may define and delimit a central space/region 518 within the portion 508 of the cable 500. The region 518 may contain and enclose four FC differential pair bundles 564, 566, 568, and 570. The outer surfaces of the bundles 564, 566, 568, and 570 may physically contact each other, a central region filler member 560, and the inner surface of the binder member 516. The central region filler member 560 may have a generally circular transverse cross-section, and may be made out of solid polyethylene.

A first 564 of the bundles 564, 566, 568, and 570 may comprise a pair 572, 574 of FC AL differential data signal conductor/transmitter members enclosed by a respective bundle electromagnetic shield member. A second 566 of the bundles 564, 566, 568, and 570 may comprise a pair 584 and 586 of FC AL differential data signal conductor/transmitter members enclosed by a respective bundle shield member. A third 568 of the bundles 564, 566, 568, 570 may comprise a pair 580 and 582 of FC AL differential data signal conductor/transmitter members enclosed by a respective bundle electromagnetic shield member. A fourth 570 of the bundles 564, 566, 568, 570 may comprise a pair 576 and 578 of FC AL differential data signal conductor/transmitter members enclosed by a respective bundle electromagnetic shield member. Each of the members 572, 574, 576, 578, 580, 582, 584, and 586 may comprise a respective central conductive wire/filament (e.g., 28 AWG solid silver plated copper material) surrounded by a respective layer of insulating material (e.g., polyolefin material that is 0.059 inches in diameter). The respective bundle shield members in cable 500 may each comprise respective aluminized polyester members, with each such aluminized polyester member comprising a respective inwardly facing layer of aluminum bonded to a respective layer of polyester.

Each of the above-described features 502, 510, 512, 514, 516, 518, 520, 522, 524, 526, 528, 530, 532, 534, 536, 538, 540, 542, 544, 546, 548, 550, 552, 554, 556, 558, 560, 564, 566, 568, 570, 572, 574, 576, 578, and 580 may extend at least the length of the member 508, and additionally, the cable 500 may be configured and constructed such that each of the electrically conductive structures comprised in the cable 500 (e.g., the outer shield member 510, the aluminum layer 514 of the inner shield member, the filaments/wires comprised in the FC control signal conductor members 522, 524, 526, 528, 530, 532, 534, 536, 538, 540, 542, 544, 546, 548, 550, 552, 554, 556, and 558, the aluminum layers comprised in the bundle shield members, and the filaments/wires comprised in the FC AL differential data signal conductor members 572, 574, 576, 578, 580, 582, 584, and 586 may terminate with a respective conductive termination at each of the connector mechanisms 504 and 506. The connector mechanisms 504 and 506 (and the respective sets of conductive terminations comprised therein) may be either male or female in respective connection gender depending upon the respective connection genders of the respective connectors (not shown) to which they are intended to be coupled.

It is important to note that the dimensions stated herein for the various components of the cable 500 are merely for illustrative purposes. Accordingly, the dimensions of the components of the cable 500 may vary without departing from the first embodiment of the present invention.

With reference now being made to FIGS. 5 and 9, the respective FC control, data, and other signals that may be transmitted via the afore-described electrically conductive structures illustrated in FIG. 5 will be described. FIG. 9 is a schematic illustration showing the set 901 of respective terminations 902, 904, . . . 974 that may be provided in the connector mechanism 506. Terminations (not shown) may be provided in the connector mechanism 504 that may correspond to the terminations 902, 904, . . . 974 in connector mechanism 506.

Terminations 902 and 940 may be used to transmit a differential pair of FC. receive data signals, via the conductive filaments/wires in differential pair members 572 and 574, for use in implementing a first FC AL for use in communicating between the disk adapter 30A and one of the PBC cards in the chassis 202. Terminations 904 and 942 may be used to transmit logical ground signals, via the aluminum layer comprised in the bundle shield members comprised in the bundles 564 and 570, for use in connection with the FC receive and transmit signals, respectively, used in the first FC AL. Terminations 906 and 944 may be used to transmit a differential pair of FC transmit data signals, via the conductive filaments/wires in differential pair members 576 and 578, for use in implementing the first FC AL. Terminations 938 and 974 may be used to transmit a differential pair of FC transmit data signals, via the conductive filaments/wires in differential pair members 584 and 586, for use in implementing a second FC AL for use in communicating between the adapter 30A and another of the PBC cards in the chassis 202. Terminations 934 and 970 may be used to transmit a differential pair of FC receive data signals, via the conductive filaments/wires in the differential pair members 580 and 582, for use in implementing the second FC AL. Terminations 936 and 972 may be used to transmit logical ground signals, via the aluminum layer comprised in the bundle shield member comprised in the bundles 568 and 566, for use in connection with the FC transmit and receive signals, respectively, used in the second FC AL.

Terminations 920, 946, and 968 may be used to transmit ground signals, via the aluminum layer 514, for use in the first and second FC AL. Terminations 916, 918, 922, and 924 may be unused (i.e., spare terminations). The remaining terminations 908, 910, 912, 914, 926, 928, 930, 932, 948, 950, 952, 954, 956, 958, 960, 962, 964, and 966 may be used to transmit respective control signals, via respective conductive filaments/wires comprised in respective FC control signal conductive members 522, 524, 526, 528, 530, 532, 534, 536, 538, 540, 542, 544, 546, 548, 550, 552, 554, 556, and 558, that may be associated with or used by devices coupled to either the first or the second FC AL. Such control signals may be used, e.g., to sense whether the first and second FC AL are coupled to active ports of PBC cards in the chassis 202, to control disk subsystems coupled to the first and second FC AL, to provide an out-of-band reset signals to the PBC cards coupled to the adapter 30A, to provide information from environmental sensing devices concerning the environmental status within the mounting system 200, to provide serial interrupt signals involving or for use by such disk subsystems, and to provide logical address information that may be assigned to chassis comprised in the mounting system 200, in accordance with the teachings of co-pending U.S. patent application Ser. No. 09/877,869, entitled "Address Mapping In Mass Storage Device Mounting System," filed Jun. 7, 2001.

Thus, it is evident that there has been provided, in accordance with the present invention, an FC cable that fully satisfies the aims and objectives, and achieves the advantages, hereinbefore set forth. The terms and expressions which have been employed in this application are used as terms of description and not of limitation, and there is no intention, in the use of such terms and expressions, of excluding any equivalents of the features shown and described or portions thereof, but it is recognized that various modifications are possible within the scope of the invention as claimed.

Other modifications are also possible. For example, although the cache 16, disck controllers 18A . . . 18N, and host controllers 22 . . . 24 have been described as being coupled together via bus system 14, if system 112 is appropriately modified, the cache 16, disk controllers 18A . . . 18N, and host controllers 22 . . . 24 may be coupled together and communicate via data transfer and messaging systems of the type disclosed in e.g., copending U.S. patent application Ser. No. 09/745,814, entitled, "Data Storage System Having Crossbar Switch with Multi-Staged Routing," filed Dec. 21, 2000; thus copending Application is owned by the owner of the subject application is hereby incorporated by reference in its entirety. Additional modifications are also possible. Accordingly, the present invention should be viewed broadly as encompassing all modifications, variations, alternatives and equivalents as may be encompassed by the hereinafter-appended claims.

What is claimed is:

1. Cable that may be used to transmit signals that may be used to implement both a first fibre channel (FC) arbitrated loop (AL) and a second FC AL, the cable comprising:

a first set of electrical conductors that may be used to transmit control signals associated with the first FC AL and the second FC AL;

a second set of electrical conductors that may be used to transmit data signals of the first FC AL and the second FC AL; and the first set of electrical conductors being disposed outside of a periphery of a central region in the cable that contains the second set of electrical conductors, the second set of electrical conductors comprising first and second subsets of electrical conductors, each of the first and second subsets of electrical conductors including two respective pairs of electrical conductors, the first subset of electrical conductors being for transmitting data signals of the first FC AL, the second subset of electrical conductors being for transmitting data signals of the second FC AL, the first subset of electrical conductors being disposed about a first central filler member and being surrounded by a first electrical shield member, the second subset of electrical conductors being disposed about a second central filler member and being surrounded by a second electrical shield member.

2. The cable of claim 1, wherein the cable further comprises third and fourth electrical shield members, the third electrical shield member surrounding the first set of electrical conductors, the fourth electrical shield member surrounding the third electrical shield member.

3. The cable of claim 1, wherein each respective electrical conductor in the first and second sets of electrical conductors comprises a respective metal core surrounded by an insulating material.

4. The cable of claim 1, wherein the central region also contains two additional filler members.

5. The cable of claim 4, wherein the central region is enclosed by a binding member.

6. The cable of claim 5, wherein the cable further comprises a foil shield member that surrounds the first set of electrical conductors, and a braided shield member that surrounds the foil shield member.

7. Cable that may be used to transmit signals that may be used to implement both a first fibre channel (FC) arbitrated loop (AL) and a second FC AL, the cable comprising:

a first set of electrical conductors that may be used to transmit control signals associated with the first FC AL and the second FC AL;

a second set of electrical conductors that may be used to transmit data signals of the first FC AL and the second FC AL; and the first set of electrical conductors being disposed around a central region in the cable that contains the second set of electrical conductors, the second set of electrical conductors comprising first, second, third and fourth subsets of electrical conductors, each of the subsets of electrical conductors including a respective pair of electrical conductors that may transmit a respective subset of the data signals of the first and second FC arbitrated loops, the subsets of electrical conductors being disposed about a central filler member that is disposed at a central portion of the cable, each of the subsets of electrical conductors being surrounded by a respective electrical shield member.

8. The cable of claim 7, wherein the cable further comprises a foil shield member that surrounds the first set of electrical conductors, and braided shield member that surrounds the foil shield member.

9. The cable of claim 7, wherein each respective electrical conductor in the first and second sets of electrical conductors comprises a respective metal core surrounded by an insulating material.

10. The cable of claim 7, wherein the central region is enclosed by a binding member.

11. The cable of claim 10, wherein the cable further comprises a foil shield member that surrounds the first set of electrical conductors, and braided shield member that surrounds the foil shield member.

12. A cable for transmitting signals used to implement both a first fibre channel (FC) arbitrated loop (AL) and a second FC AL, the cable comprising:

a first set of electrical conductors which is configured to transmit a set of control signals associated with the first FC AL and the second FC AL; and a second set of electrical conductors which is configured to transmit a set of data signals of the first FC AL and the second FC AL;

wherein the first set of electrical conductors is disposed outside of a periphery of a central region in the cable that contains the second set of electrical conductors, wherein the second set of electrical conductors includes first and second subsets of electrical conductors, each of the first and second subsets of electrical conductors including two respective pairs of electrical conductors, wherein the first subset of electrical conductors is configured to transmit data signals of the first FC AL, wherein the second subset of electrical conductors is configured to transmit data signals of the second FC AL, wherein the first subset of electrical conductors is disposed about a first central filler member and is surrounded by a first electrical shield member, and wherein the second subset of electrical conductors is disposed about a second central filler member and is surrounded by a second electrical shield member.

13. The cable of claim 12 wherein the first set of electrical conductors includes:

a series of conductors disposed around the periphery of the central region in the form of a single layer of individual signal conductors around the second set of electrical conductors.

14. The cable of claim 12, further comprising:

a first region filler member and a second region filler member, each of the first and second region filler members extending adjacently along the first and second subsets of electrical conductors to position the first and second subsets of electrical conductors relative to each other within the central region.

15. The cable of claim 14 wherein the first set of electrical conductors includes:

a series of conductors disposed around the periphery of the central region in the form of a single layer of individual signal conductors around the second set of electrical conductors.

16. A cable for transmitting signals used to implement both a first fibre channel (FC) arbitrated loop (AL) and a second FC AL, the cable comprising:

a first set of electrical conductors which is configured to transmit a set of control signals associated with the first FC AL and the second FC AL; and a second set of electrical conductors which is configured to transmit a set of data signals of the first FC AL and the second FC AL;

wherein the first set of electrical conductors is disposed around a central region in the cable that contains the second set of electrical conductors, wherein the second set of electrical conductors includes first, second, third and fourth subsets of electrical conductors, each of the subsets of electrical conductors including a respective pair of electrical conductors which is configured to transmit a respective subset of the data signals of the first and second FC arbitrated loops, the subsets of electrical conductors being disposed about a central filler member that is disposed at a central portion of the cable, and wherein each of the subsets of electrical conductors is surrounded by a respective electrical shield member.

17. The cable of claim 16 wherein the first set of electrical conductors includes:
   a series of conductors disposed around the periphery of the central region in the form of a single layer of individual signal conductors around the second set of electrical conductors.

18. The cable of claim 16 wherein the central filler member contacts the respective electrical shield member surrounding each of the first, second, third and fourth subsets of electrical conductors to position the first, second, third and fourth subsets of electrical conductors relative to each other within the central region.

19. The cable of claim 18 wherein the first set of electrical conductors includes:
   a series of conductors disposed around the periphery of the central region in the form of a single layer of individual signal conductors around the second set of electrical conductors.

* * * * *